INVENTOR.
KENNETH A. RHOADS

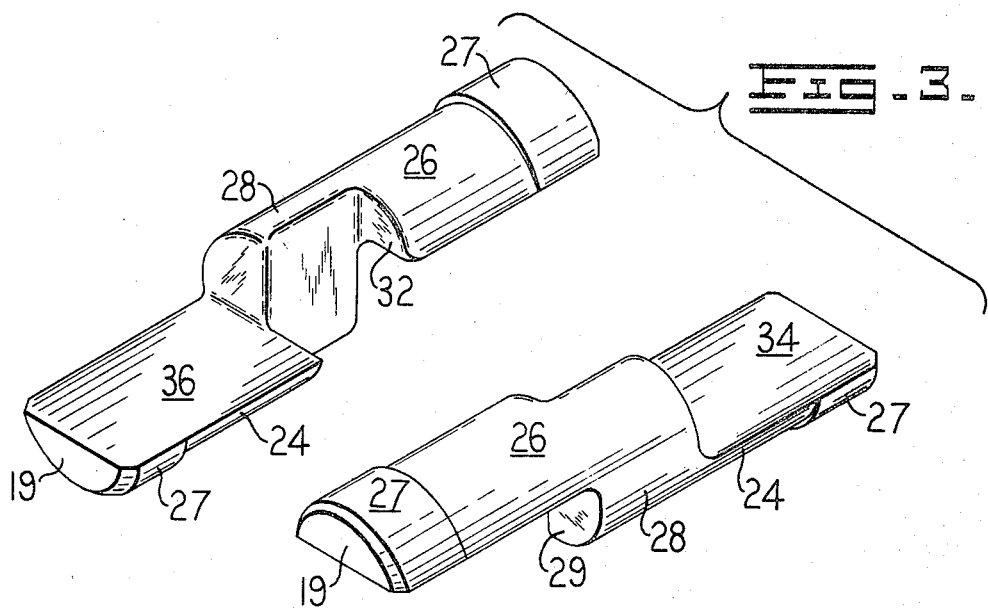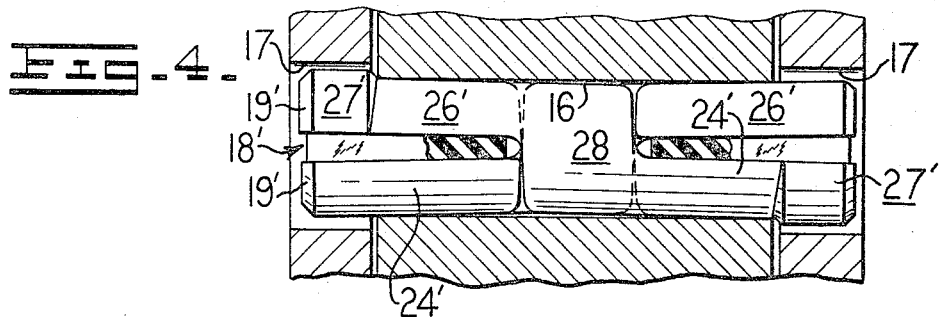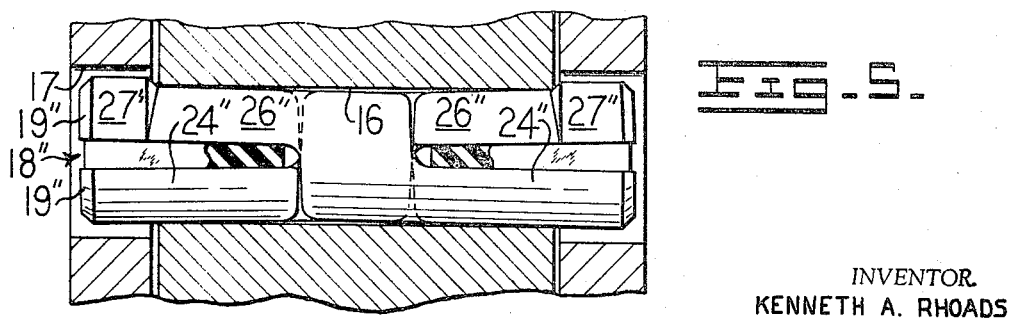

United States Patent Office 3,437,003
Patented Apr. 8, 1969

3,437,003
RETAINING PIN WITH SCISSORS-LIKE JOINT
Kenneth A. Rhoads, Peoria, Ill., assignor to Caterpillar Tractor Co., Peoria, Ill., a corporation of California
Filed Dec. 6, 1967, Ser. No. 688,473
Int. Cl. F16b 19/00, 21/00
U.S. Cl. 85—8.3           6 Claims

ABSTRACT OF THE DISCLOSURE

A cylindrical retaining pin assembly comprising two elongated pin segments where the midportion of the two pin segments combine in the pin assembly to define a scissors-like joint and an elastic spreader member is inserted between each pair of adjacent ends of the segments in the pin assembly.

---

The present invention relates to a retaining pin assembly for joining two parts which define generally coaxial bores. More particularly, the retaining pin is preferably employable for securing a shank which defines a central bore and a ripper tip member which defines a coaxial and slightly larger bore at each end of the central bore in the shank when the ripper tip is suitably positioned upon the shank.

In such applications, it is desirable that the ripper tip be readily replaceable upon its shank since substantial wear is experienced by the ripper tip. The machine upon which the tip is mounted is commonly employed to handle material which is subsequently processed in a rock crusher or similar machine. Care must be taken to ensure that the ripper tip is not lost from its shank since the tip is necessarily hardened to resist wear. If the ripper tip is lost and passes through the rock crusher, considerable expenditure of time and money for repairs may result. To meet these requirements, a retaining pin must be readily insertible into the ripper tip and shank as well as being readily removable for replacement of the tip. It is also desirable that the retaining pin be reusable after replacement of the tip.

The present invention provides an improved retaining pin for such applications which comprises two elongated pin segments. The mid portions of the two pin segments combine within the pin assembly to form a scissors-like joint. Each adjacent pair of pin segment end portions is spaced apart and has a resilient spreader member disposed therebetween to urge the adjacent pin segment end portions apart.

With this arrangement, the pin segments combine in interlocking arrangement to act substantially as a one-piece pin assembly. Axial force applied upon either end of either segment, as when the pin assembly is driven into place, is transferred directly to the other segment so that no shearing action is exerted upon the spreader members. Economy is achieved through the use of like pin segments in the pin assembly. Further, compression of one end of the retaining pin assembly tends to cause compression at the other end while the pin is disposed in a suitable bore and enhance the effectiveness of the spreader members in preventing axial motion of the pin assembly.

Accordingly, it is an object of the present invention to provide a retaining pin of the type described above with its pin segments cooperating in improved interlocking relation when assembled together.

Other objects and advantages will be made apparent in the following description and the accompanying drawings which are referenced in the description.

In the drawings:

FIG. 3 is a perspective view of the two pin segments prior to pin assembly; and

FIGS. 4 and 5 illustrate alternate embodiments of the retaining pin of FIG. 2.

Figure 1:
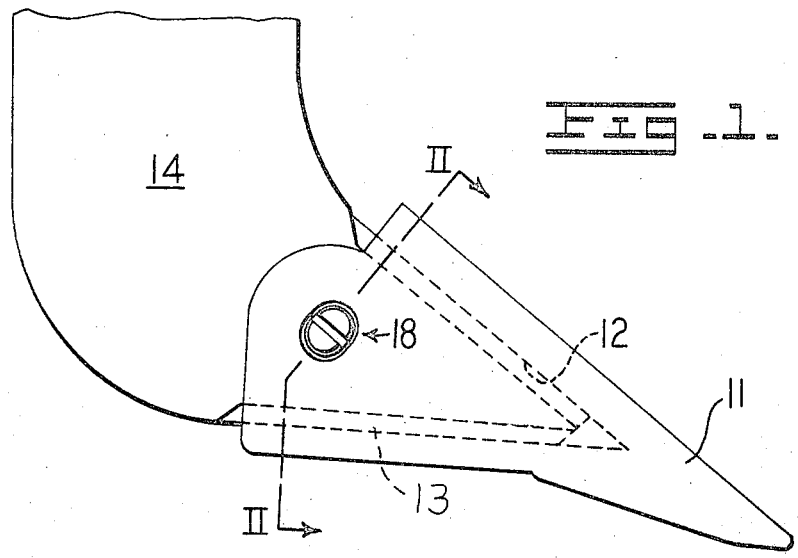
FIG. 1 is a side elevation view of a ripper tip mounted upon a shank and a retaining pin for securing them together.
Figure 2:
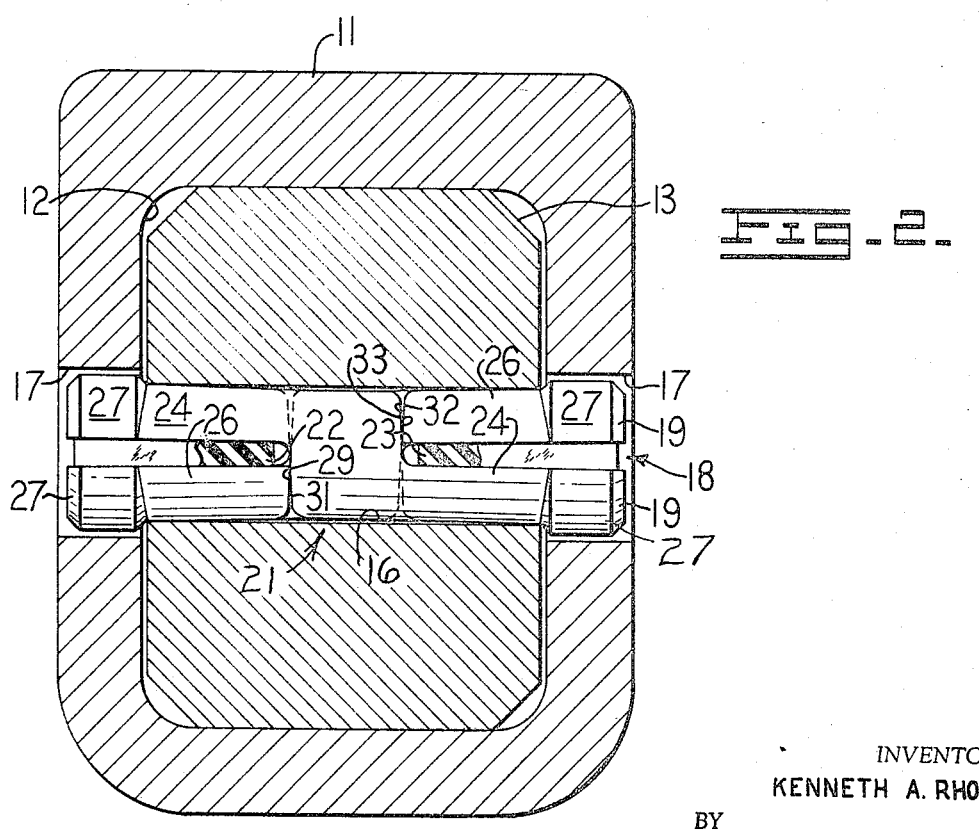
FIG. 2 is a view taken along section lines II—II of FIG. 1.

Having reference to FIGS. 1 and 2, a ripper tip 11 has a socket 12 which telescopically fits on projecting portion 13 of a shank 14. The shank defines a central bore 16 and the ripper tip defines slightly larger cross-drilled bores 17. The ripper tip is to be secured upon the shank with its socket generally mating with the projecting portion of the shank. In this position, the cross-drill bores of the ripper tip are generally coaxial with the central bore of the shank. A retaining pin assembly 18 is disposed within the coaxial bores and comprises two symmetrical elongated pin segments 19 with one segment turned end to end relative to the other segments in the pin assembly. The midportions of the two pin segments define a scissors-like joint 21 in the assembled pin. A resilient spreader member 22 and 23 is interposed between each adjacent pair of pin segment end portions 24 and 26 to urge apart the adjacent end portions of the assembled pin. Shoulder means 27 are provided on each pin segment end portion so that when the pin assembly is inserted within the coaxial bores, the shoulders act axially against the shank surrounding its central bore.

Referring to FIG. 3, the end portions 24 and 26 of each pin segment are semicylindrical and diametrically opposed relation to each other. A midportion 28 is semicylindrical and joins the two end portions of each pin segment. The semicylindrical midportion of each pin segment is disposed perpendicularly to both of its end portions. When the two pin segments are combined into the pin assembly and inserted within the bores of the ripper tip end shank, the midportions of the two pin segments combine to substantially mate with the cylindrical surface of the central bore 16. However, they are somewhat smaller than the central bore to permit flexing action of the pin assembly according to the resilient members. Each pair of pin segment end portions is urged apart by one of the resilient members, so that in combination they also tend to mate with the cylindrical surface of the central bore 16. Thus, the pin assembly tends to fill the central bore in the shank and prevent dirt or other foreign material from entering and interfering with normal action of the pin assembly. The intersections of the end portions with the midportions of the pin segments form abutting pairs of surfaces, for example, 29, 31 and 32, 33 which prevent any relative axial motion between the two pin segments in the pin assembly. The resilient members 22 and 23 are bonded to an adjoining surface, for example, 34 and 36 of at least one of the pin segment end portions to prevent loss of the resilient members from the pin assembly under normal conditions.

Referring to FIG. 4, an alternate embodiment 18' of the pin assembly comprises similar pin segments 19' with the exception that shoulder means 27 are provided on both end portions of only one of the pin segments. With this unsymmetrical arrangement, the pin assembly is compressed to a lesser degree during insertion into or removal from the central bore 16 to avoid overstressing of the resilient pad during compression of the pin assembly. Installation and removal of the pin assembly from the bores would thus be made easier.

Another alternate embodiment 18'' of the pin assembly is illustrated in FIG. 5 and comprises two pin segments 19'' which are similar to the pin segments of FIG. 1 and are also of symmetrical construction. However, in this embodiment, shoulder means 27'' is provided upon a symmetrical end portion 26'' of each pin segment only. Thus, the embodiment 18'' has the economical advantage of symmetrical pin segments as in

I claim:

1. A retaining pin comprising two substantially identical elongated pin segments, each segment comprising a midportion and two end portions, the midportions defining abutting surfaces upon assembly of the two segments to permit relative pivoting of the two segments, the end portions of each segment including a generally planar surface and being linearly offset relative to each other, whereby the generally planar surfaces are oppositely directed in substantially parallel relationship, the abutting surfaces of the midportions being disposed at substantially right angles to the generally planar end surfaces, the end portions of one segment arranged for oppositely facing an adjacent end portion of the other segment in spaced apart and generally coextensive relation upon assembly of the two segments to receive a resilient spreader member therebetween, the abutting midportions serving as a scissors-like joint for the two segments, said assembled segments defining a generally cylindrical pin.

2. The combination of claim 1 wherein a resilient member at each end of the pin is bonded to an adjoining surface of at least one of the end portions of the pin segments.

3. The combination of claim 1 wherein the two pin segments in assembly define two sets of oppositely abutting surfaces generally normal to the cylindrical pin assembly axis to resist relative axial movement of the two pin segments in either direction.

4. The combination of claim 3 wherein the pin segments are generally symmetrical, the end portions of each pin being semicylindrical and in radially opposite relation each to the other, the midportion of each pin being semicylindrical and in radially normal relation to both of its end portions, one of the symmetrical pin segments being turned end-to-end with respect to the other pin segment in the assembled pin.

5. The combination of claim 4 wherein a symmetrical end of each pin segment defines a shoulder to resist axial motion in either axial direction of both pin segments in assembly within a bore.

6. The combination of claim 4 wherein each end of one of the generally symmetrical pin segments defines a shoulder means to resist motion in either axial direction of both pin segments in assembly within a bore.

References Cited

UNITED STATES PATENTS

| | | | |
|---|---|---|---|
| 2,669,153 | 2/1954 | Launder | 85—8.3 |
| 3,022,586 | 2/1962 | Towne | 85—8.3 |
| 3,175,314 | 3/1965 | Williamson | 85—8.3 |

CARL W. TOMLIN, *Primary Examiner.*

R. S. BRITTS, *Assistant Examiner.*

U.S. Cl. X.R.

37—142; 306—1.6